(12) United States Patent
Hsing et al.

(10) Patent No.: US 8,917,076 B2
(45) Date of Patent: Dec. 23, 2014

(54) OFF-LINE REGULATOR WITH PASS DEVICE AND ASSOCIATED METHOD

(75) Inventors: Michael R. Hsing, Saratoga, CA (US); Eric Yang, Saratoga, CA (US); Zheng Luo, Chengdu (CN); Ken Yi, Chengdu (CN); Yiqing Jin, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 210 days.

(21) Appl. No.: 13/572,564

(22) Filed: Aug. 10, 2012

(65) Prior Publication Data
US 2014/0043875 A1  Feb. 13, 2014

(51) Int. Cl.
*G05F 1/00* (2006.01)
*H02M 7/04* (2006.01)

(52) U.S. Cl.
USPC .............. 323/284; 323/271; 323/282; 363/89

(58) Field of Classification Search
CPC .......................... G05F 1/56; H02M 2001/0045
USPC .............. 363/77, 89; 323/222–225, 271–275, 323/282–285
See application file for complete search history.

(56) References Cited

U.S. PATENT DOCUMENTS

| | | | | |
|---|---|---|---|---|
| 4,330,816 A | * | 5/1982 | Imazeki et al. ............ | 363/21.05 |
| 4,825,351 A | * | 4/1989 | Uesugi ............................. | 363/79 |
| 5,469,046 A | * | 11/1995 | Wong et al. .................... | 323/286 |
| 5,818,707 A | * | 10/1998 | Seong et al. ..................... | 363/89 |
| 5,903,138 A | * | 5/1999 | Hwang et al. .................. | 323/266 |
| 6,040,663 A | * | 3/2000 | Bucks et al. ..................... | 315/291 |
| 6,044,000 A | * | 3/2000 | Twardzik ......................... | 363/90 |
| 6,069,470 A | * | 5/2000 | Feldtkeller ..................... | 323/222 |
| 6,194,885 B1 | * | 2/2001 | Oshima .......................... | 323/285 |
| 6,462,962 B1 | * | 10/2002 | Cuk ................................. | 363/16 |
| 6,661,258 B1 | * | 12/2003 | Huang ............................. | 327/81 |
| 6,781,422 B1 | * | 8/2004 | Yang .............................. | 327/108 |
| 6,897,643 B2 | | 5/2005 | Stone | |
| 7,031,173 B2 | * | 4/2006 | Feldtkeller ....................... | 363/89 |
| 7,135,845 B2 | * | 11/2006 | Zverev et al. .................. | 323/284 |
| 8,049,551 B2 | | 11/2011 | Kotowski et al. | |
| 8,129,958 B2 | * | 3/2012 | Ku et al. ......................... | 323/207 |
| 8,233,301 B1 | * | 7/2012 | Guo .............................. | 363/140 |
| 8,324,823 B2 | * | 12/2012 | Choi et al. ..................... | 315/244 |
| 2004/0136206 A1 | * | 7/2004 | Kinoshita et al. ............... | 363/16 |

(Continued)

OTHER PUBLICATIONS

U.S. Appl. No. 13/347,378, Yang.

(Continued)

*Primary Examiner* — Timothy J Dole
*Assistant Examiner* — Yusef Ahmed
(74) *Attorney, Agent, or Firm* — Perkins Coie LLP

(57) ABSTRACT

An off-line regulator has a rectification circuit configured to rectify an AC line voltage into a rectified line voltage, a pass device coupled between the rectified line voltage and a first capacitor, and a converter. The pass device is configured to be turned ON or OFF according to a comparison signal indicating whether the rectified line voltage is over a threshold voltage. The first capacitor delivers an interim voltage into the converter which supplies power to a load. Wherein a second capacitor coupled across a driver which driving the pass device is charged by the first capacitor when the comparison signal is at a first state, and the driver is boosted when the comparison signal is at a second state.

18 Claims, 7 Drawing Sheets

(56) References Cited

U.S. PATENT DOCUMENTS

| | | |
|---|---|---|
| 2005/0083019 A1* | 4/2005 | Green .............................. 320/137 |
| 2005/0212501 A1* | 9/2005 | Acatrinei ....................... 323/283 |
| 2005/0219871 A1* | 10/2005 | Li et al. ......................... 363/21.1 |
| 2006/0013026 A1* | 1/2006 | Frank et al. ...................... 363/89 |
| 2006/0083038 A1* | 4/2006 | Lynch ............................ 363/127 |
| 2007/0103948 A1* | 5/2007 | Patchornik ...................... 363/49 |
| 2008/0180977 A1* | 7/2008 | Zheng et al. ................... 363/125 |
| 2009/0147546 A1* | 6/2009 | Grande et al. .............. 363/21.16 |
| 2009/0213629 A1* | 8/2009 | Liu et al. ......................... 363/89 |
| 2010/0014326 A1* | 1/2010 | Gu et al. ......................... 363/45 |
| 2010/0165679 A1* | 7/2010 | Lu et al. ......................... 363/89 |
| 2011/0085354 A1* | 4/2011 | Wang et al. ................. 363/21.02 |
| 2011/0096574 A1* | 4/2011 | Huang ....................... 363/21.18 |
| 2011/0122668 A1* | 5/2011 | Lo et al. ......................... 363/126 |
| 2012/0033465 A1* | 2/2012 | Lee et al. ......................... 363/53 |
| 2012/0049822 A1 | 3/2012 | Li et al. |
| 2012/0170335 A1* | 7/2012 | Lee et al. ......................... 363/89 |
| 2012/0195076 A1* | 8/2012 | Zhang et al. ............... 363/21.12 |
| 2013/0027983 A1* | 1/2013 | Nate et al. .................. 363/21.01 |
| 2013/0188405 A1* | 7/2013 | Jin et al. ......................... 363/49 |
| 2013/0201731 A1* | 8/2013 | Gu et al. ..................... 363/21.17 |

OTHER PUBLICATIONS

U.S. Appl. No. 13/092,699, Jung.
U.S. Appl. No. 13/310,306, Ren.
U.S. Appl. No. 13/474,545, Zhang.

\* cited by examiner

US 8,917,076 B2

OFF-LINE REGULATOR WITH PASS DEVICE AND ASSOCIATED METHOD

TECHNICAL FIELD

The present invention generally relates to power supply, and more particularly but not exclusively relates to off-line linear regulators.

BACKGROUND

In many applications, it is desired to obtain a direct-current (DC) power from alternating-current (AC) line. Usually, the DC output voltage is low compared to the AC line voltage. For example, in a household electronic appliance, an AC line voltage having a magnitude of 220 volts and a frequency of 50 HZ is converted into a DC power having an output voltage of 5 volts and an output current of 30 mA to supply a microprocessor inside the appliance. Switching converter, such as high-side buck converter, is commonly used to obtain the desired DC power from AC line, referring to FIG. 1. Magnetic inductor Li and high voltage capacitors C1 and C2 are necessary to obtain the desired power at node OUT, which leads to bulky size and high bill-of-material (BOM) cost. Furthermore, the high frequency switching of switch M may result in high Electro-Magnetic-Interference (EMI) noise.

Accordingly, an improved method is desired to overcome at least part of the above mentioned deficiencies.

SUMMARY

One embodiment of the present invention discloses an off-line regulator. The off-line regulator comprises: a rectification circuit configured to rectify an alternating current (AC) line voltage into a rectified line voltage; a pass device having a first end, a second end and a control end, wherein the first end is coupled to the rectified line voltage; a comparator configured to compare the rectified line voltage with a threshold voltage, the comparator having an output configured to provide a comparison signal; a driver, having an input, an output, a first power end and a second power end, wherein the input of the driver is coupled to the output of the comparator, and wherein the output of the driver is coupled to the control end of the pass device; a first capacitor, having a first end and a second end, wherein the first end of the first capacitor is coupled to the second end of the pass device, the first end of the first capacitor configured to provide an interim voltage, and wherein the second end of the first capacitor is coupled to a reference ground; a second capacitor, having a first end and a second end, wherein the first end of the second capacitor is coupled to the first power end of the driver, and wherein the second end of the second capacitor is coupled to the second power end of the driver; and a converter configured to provide power to a load, the converter having an input and an output, wherein the input of the converter is coupled to the interim voltage, and wherein the output of the converter is configured to provide a direct current (DC) output voltage; wherein the second capacitor is configured to be discharged when the comparison signal is at a first state, and wherein the second capacitor is configured to be charged by the first capacitor when the comparison signal is at a second state.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "off-line regulator" may refer to a converter which converts an AC line voltage into a DC output voltage, or, to a part of the converter to facilitate converting an AC line voltage into a DC voltage. For example, "off-line regulator" may refer to a controller engaged in converting an AC line voltage into a DC voltage, or to an integrated circuit comprising a portion of the components of a system which converts an AC line voltage into a DC voltage.

Figure 1:
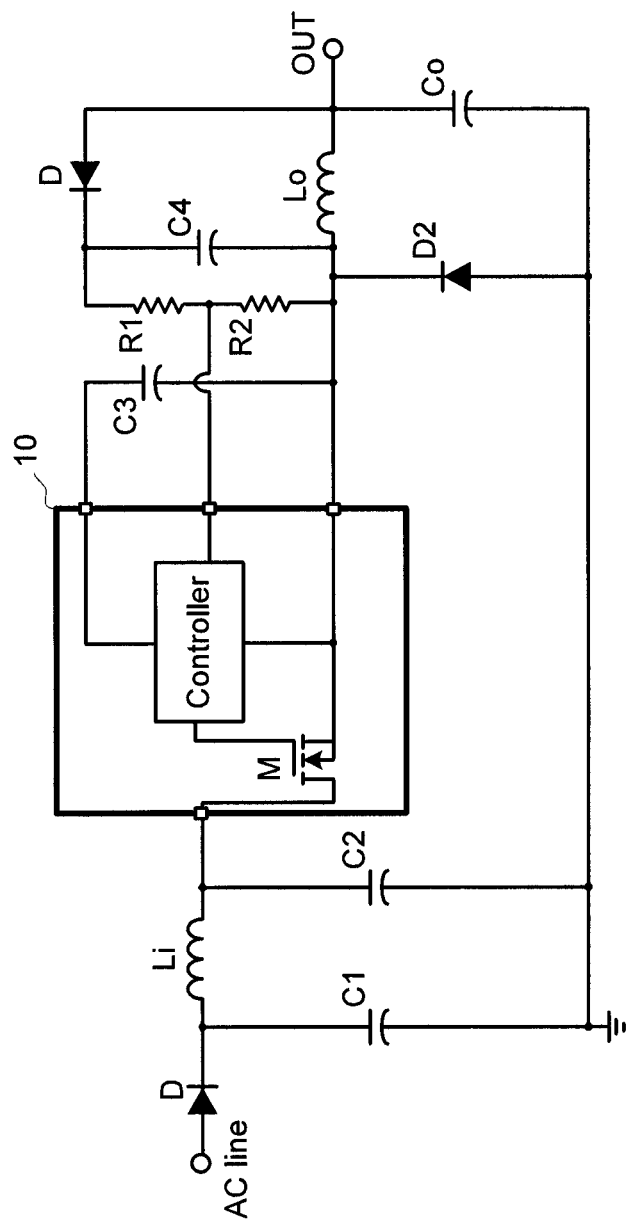
FIG. 1 illustrates a prior art off-line regulator.
Figure 2:
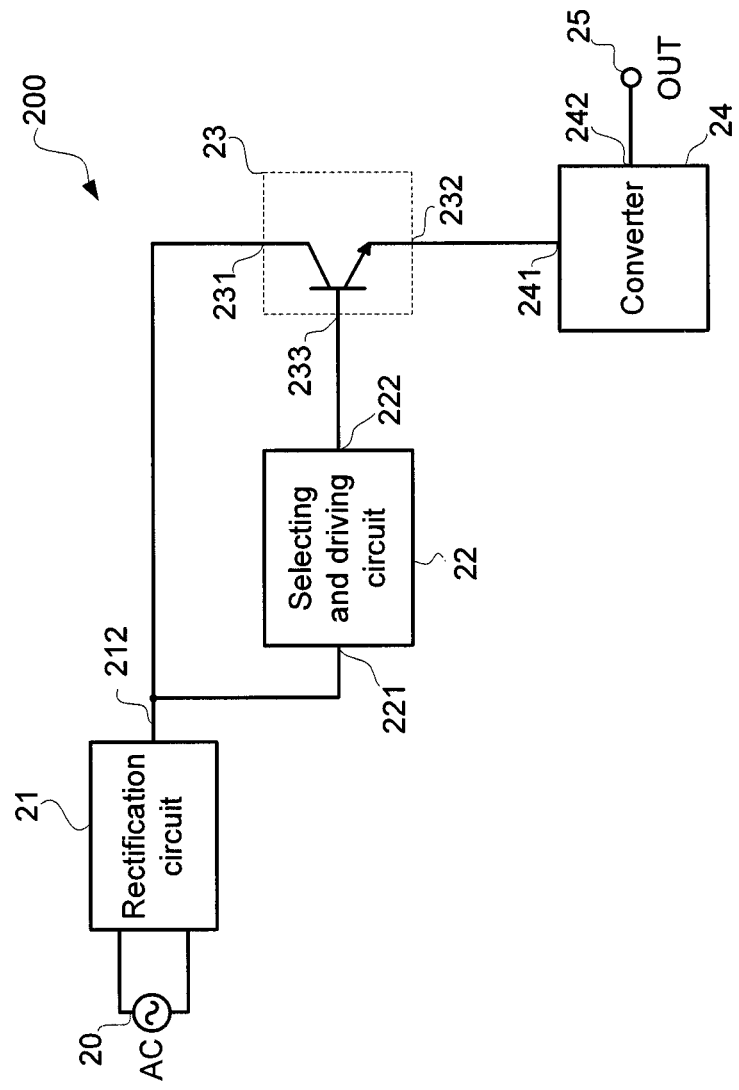
FIG. 2 illustrates a schematic block diagram of an off-line regulator according to an embodiment of the present invention.

FIG. 2 illustrates a schematic block diagram of an off-line regulator according to an embodiment of the present invention. Off-line regulator 200 comprises a rectification circuit 21, a pass device 23, a selecting and driving circuit 22 and a converter 24. The rectification circuit 21 rectifies an AC line voltage 20 and outputs a rectified line voltage at an output 212. The AC line voltage 20 may be a sinusoidal signal of the mains supply with an effective magnitude of about 220 Volts or 110 Volts. The pass device 23 has a first end 231 coupled to the rectified line voltage, a second end 232 and a control end 233. The pass device is controlled by the signal at the control end 233, and selectively turns ON and OFF. When the pass device is turned ON, current flows from the first end 231 to the second end 232 of pass device 23. In one embodiment as shown in FIG. 2, pass device 23 comprises an NPN bipolar junction transistor (BJT). The control end 233 is a base end, the first end is a collector and the second end is an emitter. In another embodiment, pass device 23 comprises a PNP BJT, where the first end is an emitter end and the second end is a collector end. Selecting and driving circuit 22 receives the rectified line voltage at output 212 of rectification circuit 21, and drives the pass device 23 at least according to the rectified line voltage, e.g., when the rectified line voltage is lower than a threshold voltage. Accordingly, selecting and driving circuit 22 has an input 221 coupled to the rectified line voltage and an output 222 coupled to the control end 233 of pass device 23. Converter 24 has an input 241 and an output 242. Input 241 of converter 24 is coupled to the second end 232 of pass device 23. Output 242 of converter 24 provides a DC output voltage at an output port OUT. In one embodiment, converter 24 comprises a low drop out (LDO) linear regulator. In other embodiments, converter 24 may comprise other types of converters, such as buck converter, boost converter or buck-boost converter. Under the ON and OFF actions of BJT device 23, the output 232 of BJT device 23 provides an interim voltage Vm which is used as an input of converter 24. The interim voltage is decreased from the rectified line voltage Vin, thus assuring that the input voltage of converter 24 is low and is adapted to the low power consumption applications.

Figure 3:
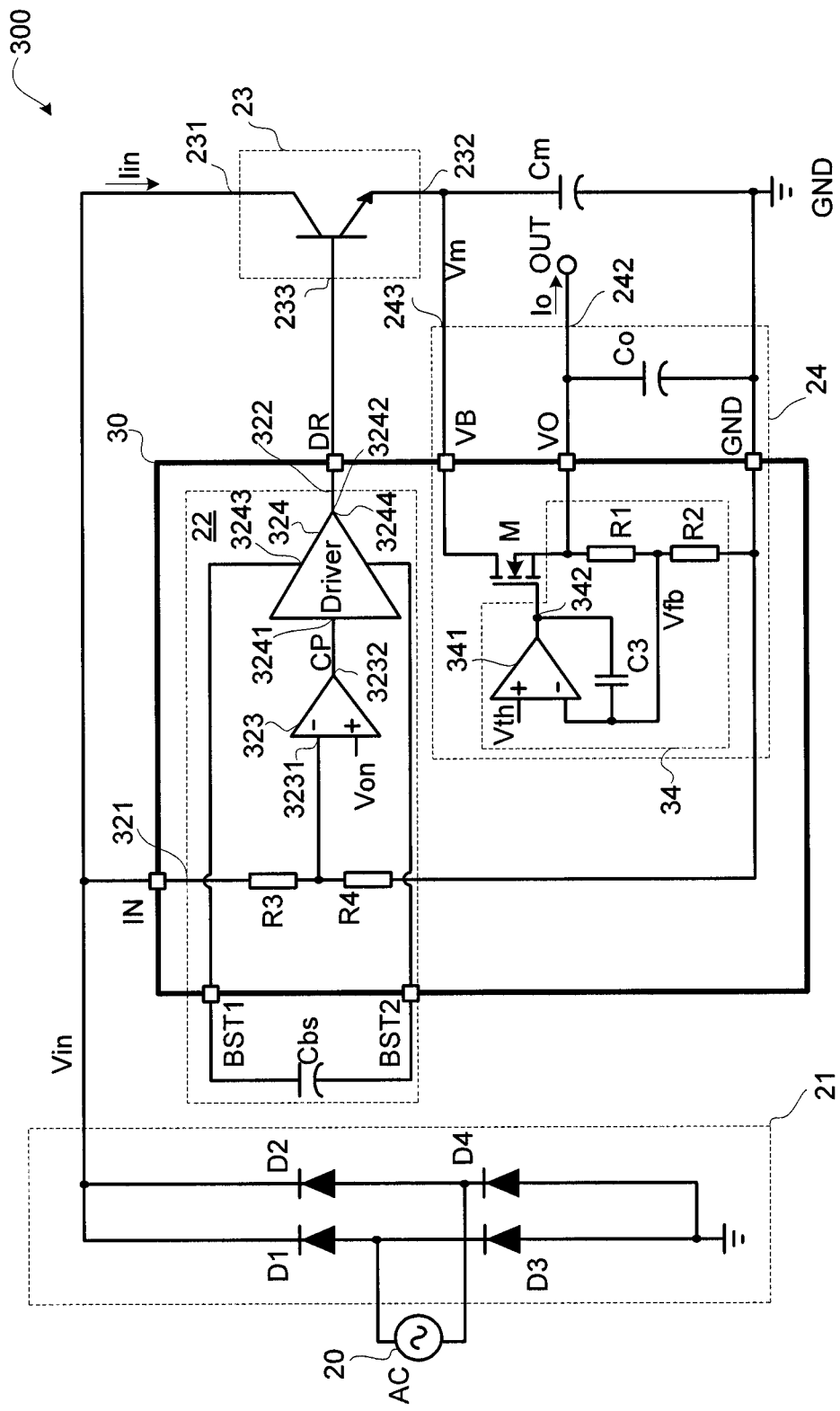
FIG. 3 illustrates a schematic diagram of an off-line regulator according to an embodiment of the present invention.

FIG. 3 illustrates a schematic diagram of an off-line regulator 300 according to an embodiment of the present invention. Off-line regulator 300 comprises a rectification circuit 21, a pass device 23, a selecting and driving circuit 22 and a converter 24. Rectification circuit 21 rectifies an AC line voltage 20 and outputs a rectified line voltage Vin. The rectification circuit 21 shown in FIG. 3 comprises a full bridge rectifier. Full bridge rectifier 21 comprises diodes D1, D2, D3 and D4. The anode of diode D1 and the cathode of diode D3 are coupled to one terminal of AC line 20. The anode of diode D2 and the cathode of diode D4 are coupled to another terminal of AC line 20. The anodes of diodes D3 and D4 are coupled to a reference voltage and the cathodes of diodes D1 and D2 are coupled to the output of rectification circuit configured to provide the rectified line voltage Vin.

Continuing with FIG. 3, pass device 23 has a first end 231 coupled to the rectified line voltage Vin, a second end 232 and a control end 233. Pass device 23 is controlled by the driving signal at the control end 233, and selectively turns ON and OFF according to the driving signal. When the pass device is turned ON, current flows from the first end 231 to the second end 232 of pass device 23. In one embodiment as shown in FIG. 3, pass device 23 comprises an NPN bipolar junction transistor (BJT). In another embodiment, pass device 23 comprises a PNP BJT. In another embodiment, pass device 23 comprises a field effect transistor (FET) such as a metal oxide semiconductor field effect transistor (MOSFET). Yet in another embodiment, pass device 23 comprises an insulated gate bipolar transistor (IGBT). A pass device 23 of BJT may demand higher current than a pass device 23 of MOFET, but may have a much lower cost than a MOSFET or an IGBT device. The second end 232 of pass device 23 is coupled to a capacitor Cm and the converter 24. Capacitor Cm may stabilize the interim voltage at output 232, and provides a stabilized interim voltage as an input voltage of converter 24.

Continuing with FIG. 3, selecting and driving circuit 22 receives the rectified line voltage Vin, and drives the pass device 23 at least according to the rectified line voltage Vin, for example, when the rectified line voltage Vin is lower than a threshold voltage. Accordingly, selecting and driving circuit 22 has an input 321 coupled to the rectified line voltage Vin and an output 322 coupled to the control end 233 of pass device 23. Selecting and driving circuit 22 comprises a comparator 323, a driver 324 and a bootstrap charging capacitor Cbs. The comparator is configured to compare the rectified line voltage Vin with a threshold voltage. Comparator 323 has an inverting input 3231 coupled to a sensed rectified line voltage, a non-inverting input coupled to a threshold voltage Von, and an output 3232 providing a comparison signal CP. In the embodiment shown in FIG. 3, the sensed rectified line voltage is obtained from a voltage divider which comprises resistors R3 and R4, thus the sensed rectified line voltage is proportional to the rectified line voltage Vin. In other embodiments, the sensed rectified line voltage may be obtained through other sensing circuits and the inverting input 3231 of comparator 323 may be coupled to another type of sensing circuit, or even coupled directly to the rectified line voltage Vin. The driver 324 has an input 3241, an output 3242, a first power end 3243 and a second power end 3244. Where input 3241 is coupled to output 3232 of comparator 323. Output 3242 of driver 324 is coupled to the control end 233 of pass device 23, or coupled to the base 233 of BJT device 23. The first power end 3243 is coupled to a first end of capacitor Cbs, and the second power end 3244 is coupled to a second end of capacitor Cbs. Capacitor Cbs is aimed to bias and provide power to driver 324 through the first power end 3243 and the second power end 3244 in order to turn on pass device 23. When the comparison signal CP is HIGH, the voltages at two ends of capacitor Cbs are boosted. Capacitor Cbs provides power to driver 324 to turn on pass device 23. At this time period, capacitor Cbs is discharged by driver 324. When the comparison signal CP is LOW, pass device 23 is turned OFF and capacitor Cbs is charged by capacitor Cm.

Continuing with FIG. 3, converter 24 has an input 241 coupled to the second end 232 of pass device 23. Output 242 of converter 24 provides a DC output voltage at an output port OUT. Converter 24 in FIG. 3 comprises a LDO regulator. LDO regulator 24 comprises a transistor M, an output capacitor Co, and a driving circuit 34. The transistor has a first end coupled to the second end 232 of pass device 23, a second end coupled to the output capacitor Co configured to provide an output voltage, and a gate coupled to the driving circuit 34. Under the control at the gate, the conduction resistance from drain to source of transistor M is modulated by the gate voltage, and LDO regulator 24 provides a low drop out output voltage at output port OUT. In the shown embodiment, driving circuit 34 comprises a voltage sense circuit to generate a sensed signal Vfb of the output voltage at port OUT, and an amplifier 341. The voltage sense circuit comprises resistor divider of R1 and R2. The amplifier 341 has an inverting input coupled to the voltage sense circuit, a non-inverting input coupled to a threshold voltage Vth and an output coupled to the gate of transistor M. The amplifier amplifies the difference between the sensed signal Vfb at the common end between resistor R1 and resistor R2 and a threshold voltage Vth. Accordingly, the output voltage at output port OUT is regulated to the voltage of Vth*(R1+R2)/R2. In another embodiment, the voltage sense circuit can be other type.

In one embodiment, off-line regulator 300 comprises an off-line regulator integrated circuit 30 manufactured on a semiconductor substrate. In one embodiment, integrated circuit 30 may also be called an off-line regulator. Integrated circuit 30 may internally comprise comparator 323, driver 324, transistor M and driving circuit 34 for transistor M. Integrated circuit 30 comprises externally an input power terminal IN, an output driving terminal DR, an interim voltage terminal VB, a first bootstrap terminal BST1 and a second bootstrap terminal BST2. Input power terminal IN is internally coupled to the first input 3231 of comparator 323 and externally coupled to the rectified line voltage Vin and the first end 231 of pass device 23. Output driving terminal DR is internally coupled to output 3242 of driver 324 and externally coupled to the control end 233 of pass device 23. Interim voltage terminal VB is internally coupled to first end of transistor M of LDO regulator 24, and externally coupled to the second end 232 of pass device 23 and the first end of capacitor Cm. The other end of Cm is coupled to the reference ground GND. The first bootstrap terminal BST1 is internally coupled to the first power end 3243 of driver 324 and externally coupled to the first end of capacitor Cbs. The second bootstrap terminal BST2 is internally coupled to the second power end 3244 of driver 324 and externally coupled to the second end of capacitor Cbs. Integrated circuit 30 further comprises an output terminal VO. Output terminal VO is internally coupled to a second end of transistor M of LDO regulator 24 and is externally coupled to an output capacitor Co configured to provide an output voltage. Integrated circuit 30 may further comprise a reference ground terminal GND. Reference ground terminal GND is internally coupled to a plurality of nodes such as the voltage divider of R3 and R4, and the voltage divider of R1 and R2, and externally coupled to a reference ground GND. Capacitor Cbs is charged by capacitor Cm when pass device 23 is turned OFF.

Figure 4:
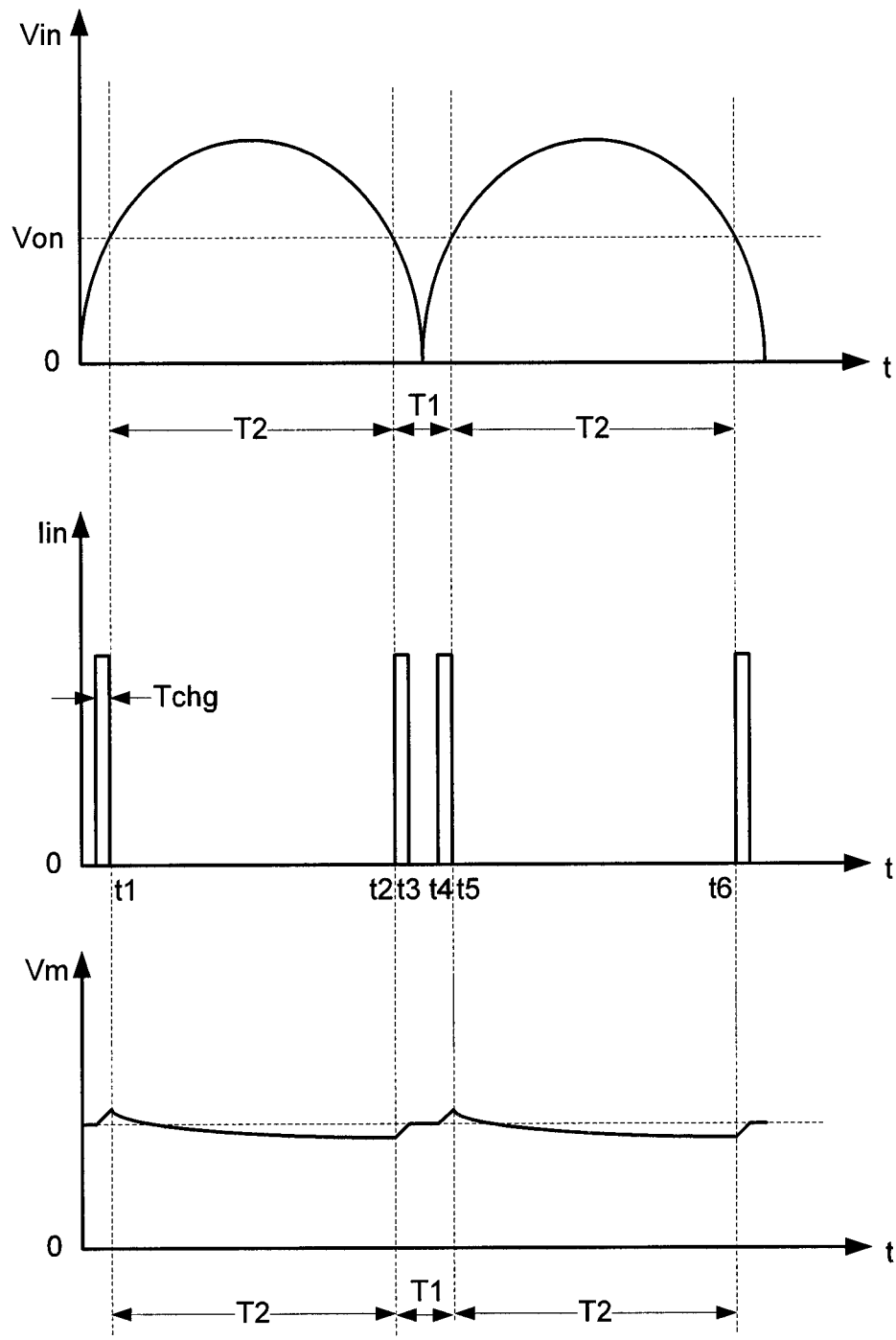
FIG. 4 shows some waveforms to illustrate the function of an off-line regulator as shown in FIG. 3, according to an embodiment of the present invention.

FIG. 4 shows some waveforms to illustrate the function of an off-line regulator as shown in FIG. 3, according to an embodiment of the present invention. The first waveform illustrates the rectified line voltage Vin. The second waveform illustrates the current Iin flowing through pass device 23 of BJT device. The third waveform illustrates the interim voltage Vm at the second end of BJT device 23. Rectified line voltage Vin is a rectified signal of a sinusoidal voltage signal. Rectified line voltage Vin is compared with a threshold voltage Von2 by the comparator 323, where Von2=Von*(R3+R4)/R4. After time t1, Vin is higher than Von2, comparator 323 outputs low level signal, the output 3242 of driver 324 is pulled down and driver 324 turns OFF pass device 23. After time t2, Vin is lower than Von2, comparator 323 outputs high level signal, the output 3242 of driver 323 is pulled high and driver 324 turns ON pass device 23. And accordingly, current flows from the first end 231 of BJT device 23 which is coupled to the rectified line voltage Vin, to the second end 232 of BJT device 23. Capacitor Cm is charged and interim voltage Vm increases. The slope of Vm increase is affected by the capacitance of capacitor Cm. When capacitor Cm is an ideal capacitor, voltage Vm is a constant value. After time t3, though output 3242 of driver 323 is pulled high, Vin is lower than Vm, and current Iin turns to zero. At time t4, Vin increases and is higher than Vm again, current flows through BJT device 23 until at time t5, Vin is higher than Von2 again and BJT device 23 is turned OFF. During the time period of T1, the rectified line voltage Vin is lower than the threshold voltage Von2 and comparison signal CP is HIGH. During time period T1, driver 324 turns ON the pass device 23. During time period T1, capacitor Cbs is discharged and provides current to the driver 324 through the first power end 3243 and the second power end 3244. During the time period of T2, the rectified line voltage Vin is higher than the threshold voltage Von2, and comparison signal CP is LOW. During time period T2, driver 324 turns OFF the pass device and capacitor Cbs is charged by capacitor Cm.

Figure 5:
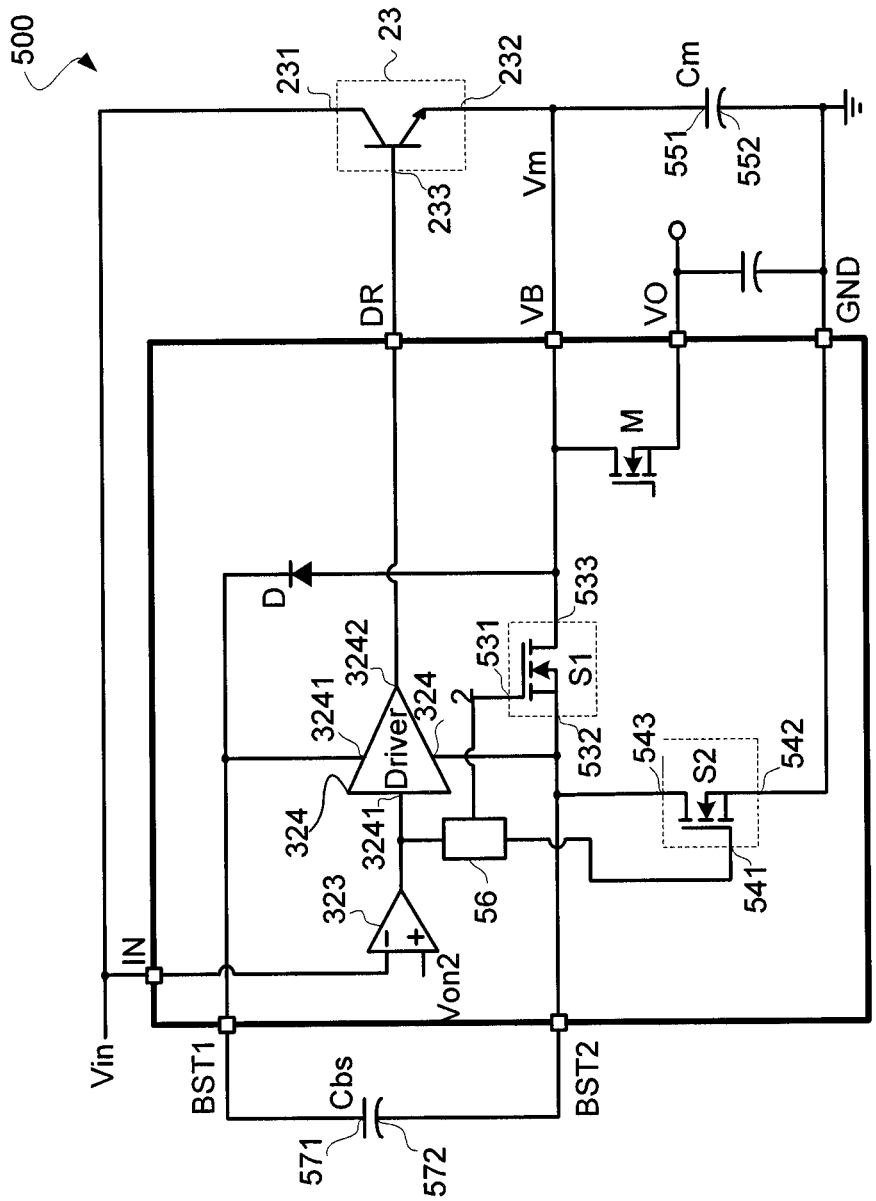
FIG. 5 schematically illustrates an off-line regulator 500 according to an embodiment of the present invention.

FIG. 5 schematically illustrates an off-line regulator 500 according to an embodiment of the present invention. The descriptions towards off-line regulator 200 in FIG. 2 and off-line regulator 300 in FIG. 3 may also apply to off-line regulator 500. Off-line regulator 500 further comprises a first switch S1, a second switch S2, and a diode D. The first switch S1 has a control end coupled to comparison signal CP through control circuit 56, a first end 532 coupled to the second end 572 of capacitor Cbs and a second end 533 coupled to the first end 551 of capacitor Cm. The first switch S1 is further coupled between the second bootstrap terminal BST2 and the interim voltage terminal VB. The second switch S2 has a control end 541 coupled to the control circuit 56, a first end 542 coupled the reference ground GND and a second end 543 coupled to the second end 572 of capacitor Cbs. Accordingly, the second switch S2 is further coupled between the second bootstrap terminal BST2 and the reference ground GND. And diode D has an anode coupled to the second end 232 of pass device 23, and has a cathode coupled to the first end 571 of capacitor Cbs. Accordingly, diode D is coupled between the first power end BST1 and the interim voltage terminal VB. The controller 56 controls the first switch S1 and the second switch S2 according to the output of comparator 323.

Continuing with FIG. 5, when the rectified line voltage Vin is lower than Von2, the output of comparator 323 is logic HIGH, referring to time period T1 in FIG. 4. During this time period, switch S1 is turned on and switch S2 is turned off. The second end 572 of capacitor Cbs is coupled to the interim voltage terminal VB and the first end 551 of capacitor Cm. Diode D is reversely biased and forms an electrical cutoff. Capacitor Cbs supplies power to driver 324 and capacitor Cbs is discharged. The second power end 3242 of driver 324 is pulled up to the interim voltage Vm and the first power end 3241 of driver 324 is pulled up to Vm+Vbs, where Vm is the interim voltage at the interim voltage terminal VB and Vbs is the voltage across capacitor Cbs. Thus, during time period T1, driver 324 is biased between Vm and Vm+Vbs, which is higher than Vm and can drive pass device of BJT device 23. In one embodiment, during time period T1, the output of driver 324 approximates Vm+Vbs and pass device 23 is turned on to charge capacitor Cm.

Continuing with FIG. 5, when the rectified line voltage Vin is higher than Von2, the output of comparator 323 is logic LOW, referring to time period T2 in FIG. 4. During time period T2, switch S1 is turned off and switch S2 is turned on. The second end 572 of capacitor Cbs is coupled to the reference ground GND and the second end 552 of capacitor Cm. Diode D is forward biased and the first end 571 of capacitor Cbs is coupled to the first end 551 of capacitor Cm. Accordingly, capacitor Cm charges capacitor Cbs where current flows from the second end 551 of capacitor Cm to the first end 571 of capacitor Cbs. With this configuration, driver 324 is biased between ground reference and Vbs, and for a BJT 23, the base voltage is lower than its emitter voltage at the interim voltage terminal VB. In one embodiment, the output of driver 324 approximates reference ground voltage GND.

Figure 6:
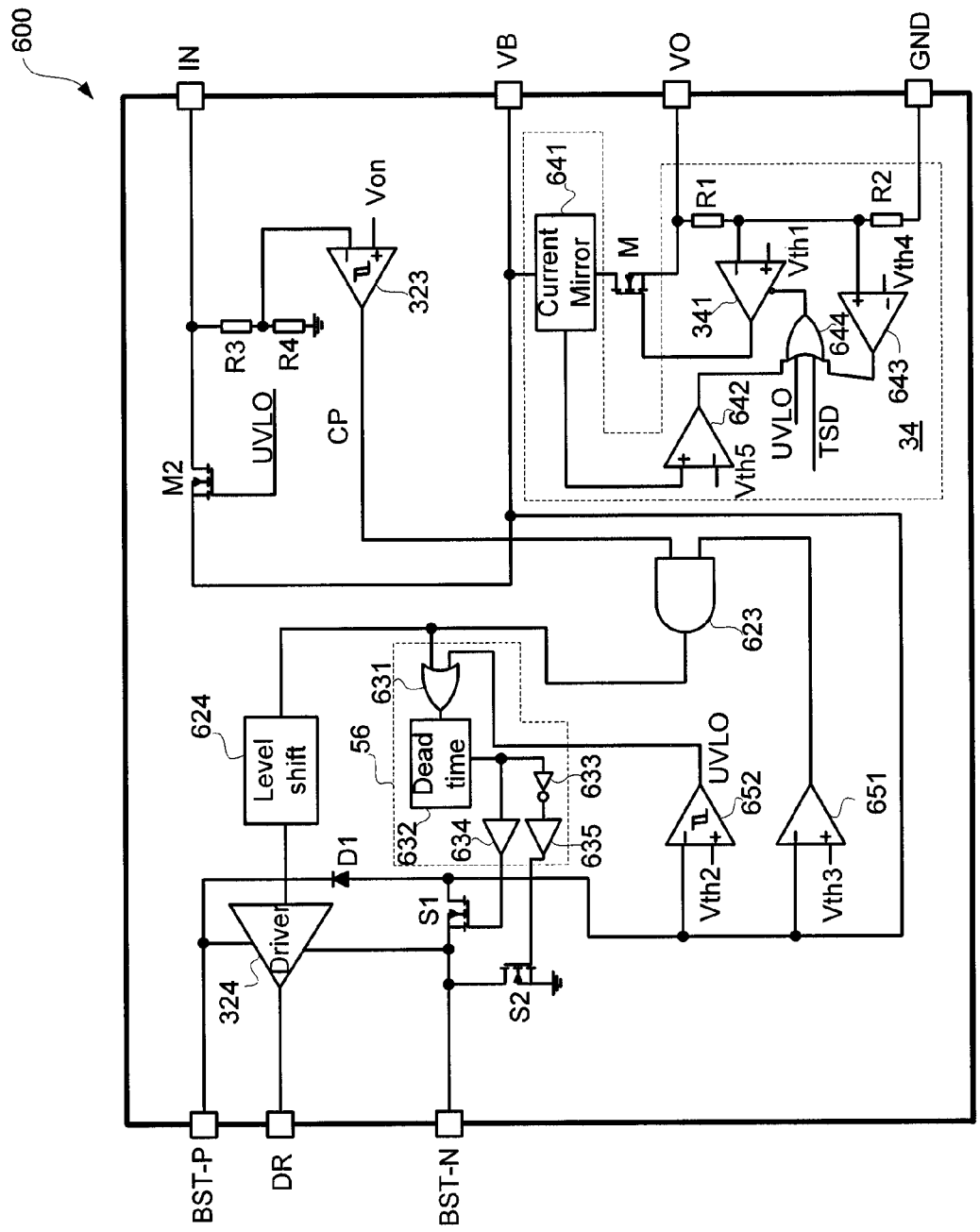
FIG. 6 shows an off-line regulator according to an embodiment of the present invention.

FIG. 6 shows an off-line regulator 600 according to an embodiment of the present invention. Off-line regulator 600 may be manufactured on a silicon die. Off-line regulator 600 comprises an input power terminal IN, an output driving terminal DR, an interim voltage terminal VB, a first bootstrap terminal BST-P, a second bootstrap terminal BST-N, and a reference ground terminal GND. Each of the above terminals may comprise a pin, a plurality of pins, an electrically conductive pad or a plurality of electrically conductive pads. Besides comparator 323, transistor M, driver 324, driving circuit 34 and a control circuit 56 for controlling switches S1 and S2, as illustrated with reference to FIG. 3 and switches S1 and S2 as illustrated in reference with FIG. 5, off-line regulator 600 further comprises an under voltage lock out (UVLO) comparator 652, an over-voltage comparator 651, a start-up switch M2 for start up control, a level shift circuit 624 to shift the voltage level of logic signals for driver 324 and an AND gate 623. The UVLO comparator 652 has an inverting input coupled to the interim voltage terminal VB, a non-inverting input coupled to an UVLO threshold voltage Vth2, and an output coupled to the control circuit 56 and the gate of switch M2. The UVLO comparator 652 compares the interim voltage Vm with the threshold voltage Vth2, and generates an UVLO signal. In the shown embodiment, the UVLO comparator 652 is a hysteresis comparator. The over-voltage comparator 651 has an inverting input coupled to the interim voltage terminal VB, a non-inverting input coupled to an over-voltage threshold voltage Vth3, and an output coupled to one input of AND gate 623. Switch M2 is coupled between the input power terminal IN and the interim voltage terminal VB, and is controlled by the output of the UVLO comparator 652. In other words, start-up switch has a first end coupled to the rectified line voltage Vin, a second end coupled to the second end of capacitor Cm and is selectively turned on according to the UVLO signal. The control circuit 56 comprises an OR gate 631, a dead time control module 632, a NOR gate 633 and two drivers 634 and 635. OR gate 631 has one input coupled to the output of AND gate 623, another input coupled to the output of the UVLO comparator 652 and an output coupled to the dead time control module 632. The dead time control module 632 prevents simultaneously turning ON both switches S1 and S2. The output of OR gate 631 is coupled to NOR gate 633. The output of NOR gate 633 is coupled to driver 635. Driver 634 drives switch S1 and driver 635 drives switch S2. And gate 623 has a first input coupled to the comparison signal CP, a second input coupled to the output of over-voltage comparator 651, and has an output coupled to driver 324 through level shift circuit 624. The driving circuit 34 for driving transistor M may further comprise a current mirror 641, an over-current comparator 642, an over-voltage comparator 643 and an OR gate 644. OR gate 644 has inputs coupled to the output of comparator 642, the output of comparator 643, the output of comparator 652 and a thermal shut down signal TSD. OR gate 644 may further receive other signals indicative of abnormal conditions. When any of the signals input to OR gate 644 is in logic HIGH, comparator 341 is disabled, and switch M of a linear regulator is turned off.

Some of the functions of off-line regulator 600 will be described with reference to FIGS. 3, 4 and 5. At the start up of off-line regulator 600, the interim voltage at interim voltage terminal VB is lower than a first threshold Vth2−Vth21, the output signal UVLO from comparator 652 is in logic HIGH. Switch M2 is turned on, and current flows from input power terminal IN to the interim voltage terminal VB, which directly charges capacitor Cm as shown in FIG. 3 and the voltage at interim voltage terminal VB increases. Where Vth21 is a low hysteretic value of comparator 652. At the same time, the output of OR gate 631 is in logic HIGH. Switch S1 is turned on and switch S2 is turned off. Driver 324 is biased between the interim voltage Vm and Vm+Vbs. Thus, pass device 23 may be turned on to charge Cm as well when Vin is lower than Von. At the same time, transistor M is turned off by the LOW UVLO.

When the voltage at the interim voltage terminal VB is higher than a threshold voltage Vth3, the output of comparator 651 is in logic LOW, and the output of AND gate 623 is also in logic LOW. Where Vth3 is higher than Vth2. Driver 324 will turn off the pass device 23 of a BJT device to stop charging capacitor Cm. At the same time, switch S1 will be turned off, switch S2 will be turned on, and capacitor Cm charges capacitor Cbs.

When the voltage at the interim voltage terminal VB increases over a second threshold Vth2+Vth21, and the voltage at the interim voltage terminal VB is not higher than threshold voltage Vth3, signal UVLO and the output of comparator 651 are in logic LOW, and off-line regulator 600 works in normal operation. Switch M2 turns off, and transistor M of a linear regulator works normally. In normal operation, the input of NOR gate 633 is coupled to the output of comparator 323, the output of NOR gate is coupled to a control end of switch S2. And the output of comparator 323 is further coupled to the control end of the first switch 51. Accordingly, when the output of comparator 323 is in logic HIGH, switch S1 is turned on, and switch S2 is turned off. And pass device 23 is turned on to charge capacitor Cm. When the output of comparator 323 is in logic LOW, switch S1 is turned off, switch S2 is turned on, and capacitor Cm charges capacitor Cbs.

Continuing with FIG. 6, comparator 323 may be a hysteresis comparator. The threshold Von and the hysteresis value of comparator 323 determines at which value of the rectified line voltage, pass device 23 starts to turn on and charges capacitor Cm. Capacitor Cm is charged at a relatively low voltage value of Vin. Accordingly, the interim voltage Vm can have a much lower value compared to the effect value of voltage Vin.

Figure 7:
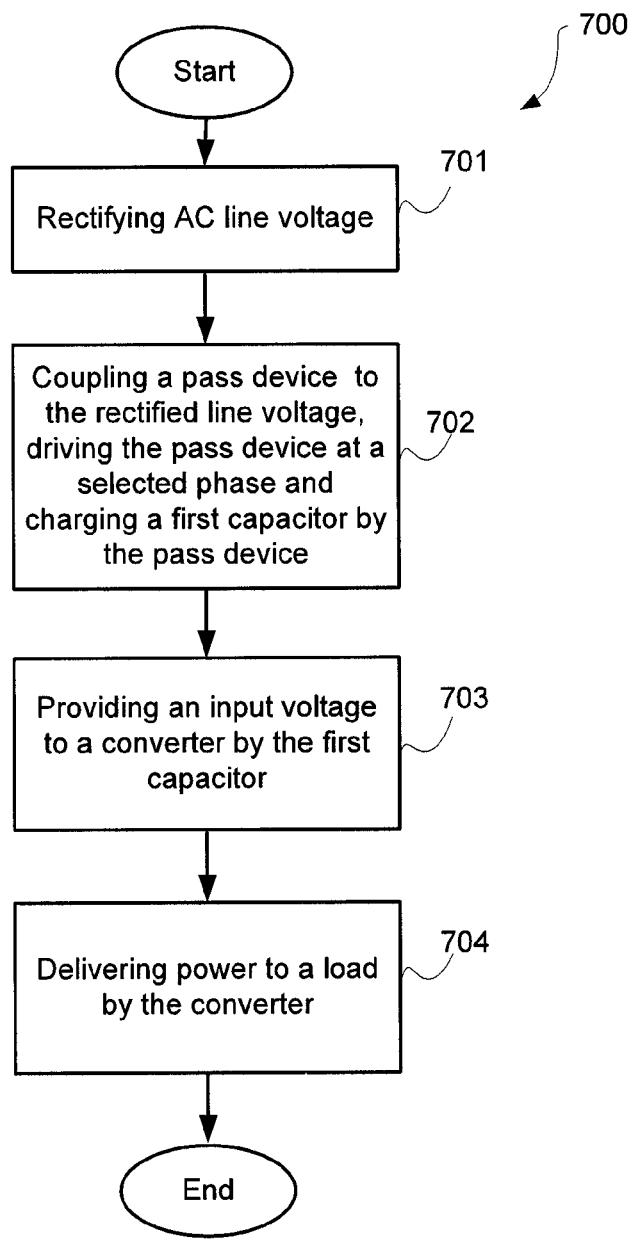
FIG. 7 illustrates a method of converting an AC voltage into a DC voltage, according to an embodiment of the present invention.

FIG. 7 illustrates a method 700 of converting an AC voltage into a DC voltage, according to an embodiment of the present invention. The method comprises in step 701, rectifying an AC line voltage into a rectified line voltage. In step 702, the method comprises coupling a pass device to the rectified line voltage, driving the pass device at a selected range of the rectified line voltage, and charging a first capacitor by the pass device. The purpose of selecting the range of the rectified line voltage is to turn on the pass device when the value of the rectified line voltage is relatively low compared to the effective value of the rectified line voltage in a whole cycle. In one embodiment, the selected range of the rectified line voltage is achieved by comparing the rectified line voltage to a threshold voltage, and the selected range is when the rectified line voltage is less the threshold voltage. In step 703, the method comprises providing an input voltage to a converter by the first capacitor. And the converter provides an output voltage. And in step 704, the method further comprises delivering power to a load by the converter. Wherein the pass device is driven by a driver. The method may further comprise coupling a second capacitor between a first power end and a second power end of the driver, wherein the second capacitor is charged by the first capacitor when the rectified line voltage is higher than a threshold, and wherein the second capacitor is boosted when the rectified line voltage is lower than the threshold.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. An off-line regulator comprising:
    a rectification circuit configured to rectify an alternating current (AC) line voltage into a rectified line voltage;
    a pass device having a first end, a second end and a control end, wherein the first end is coupled to the rectified line voltage;
    a comparator configured to compare the rectified line voltage with a threshold voltage and provide a comparison signal;
    a driver, having an input, an output, a first power end and a second power end, wherein the input of the driver is coupled to the comparison signal, and wherein the output of the driver is coupled to the control end of the pass device;

a first capacitor, having a first end and a second end, wherein the first end of the first capacitor is coupled to the second end of the pass device, the first end of the first capacitor configured to provide an interim voltage, and wherein the second end of the first capacitor is coupled to a reference ground;
a second capacitor, having a first end and a second end, wherein the first end of the second capacitor is coupled to the first power end of the driver, and wherein the second end of the second capacitor is coupled to the second power end of the driver; and
a converter configured to provide power to a load, the converter having an input and an output, wherein the input of the converter is coupled to the interim voltage, and wherein the output of the converter is configured to provide a direct current (DC) output voltage;
wherein the second capacitor is configured to be discharged when the comparison signal is at a first state, and wherein the second capacitor is configured to be charged by the first capacitor when the comparison signal is at a second state.

2. The off-line regulator of claim 1, further comprising:
a first switch having one end coupled to the second end of the second capacitor and having another end coupled to the first end of the first capacitor, wherein the first switch is configured to be turned ON when the comparison signal is at the first state and the first switch is configured to be turned OFF when the comparison signal is at the second state; and
a second switch having one end coupled to the second end of the second capacitor and having another end coupled to the reference ground, wherein the second switch is configured to be turned ON when the comparison signal is at the second state and the second switch is configured to be turned OFF when the comparison signal is at the first state.

3. The off-line regulator of claim 1, wherein the pass device comprises a bipolar junction transistor (BJT).

4. The off-line regulator of claim 1, wherein the converter comprises a low drop out (LDO) regulator.

5. The off-line regulator of claim 4, wherein the LDO regulator comprises a transistor, an output capacitor and a driving circuit, wherein:
the transistor has a first end, a second end and a gate, wherein the first end of the transistor is coupled to the interim voltage, wherein the second end of the transistor is coupled to the output capacitor, the second end of the transistor configured to provide the output voltage; and
the driving circuit comprises a voltage sense circuit and an amplifier, wherein the voltage sense circuit is configured to generate a sensed signal of the output voltage, and wherein the amplifier has:
an inverting input coupled to the sensed signal;
a non-inverting input coupled to a threshold voltage; and
an output coupled to the gate of the transistor.

6. The off-line regulator of claim 1, further comprising:
an under voltage lock out (UVLO) comparator configured to compare the interim voltage with a threshold voltage and output an UVLO signal; and
a start-up switch having a first end, a second end and a control end, wherein the first end of the start-up switch is coupled to the rectified line voltage, wherein the second end of the start-up switch is coupled to the first end of the first capacitor, and wherein the control end of the start-up switch is coupled to the UVLO signal.

7. The off-line regulator of claim 6, wherein when the UVLO signal is logic HIGH, the second capacitor is configured to be charged by the first capacitor.

8. The off-line regulator of claim 1, further comprises:
an over-voltage comparator having an inverting input, a non-inverting input and an output, wherein the inverting input is coupled to the interim voltage, and wherein the non-inverting input is coupled to a threshold voltage; and
an AND gate having a first input, a second input and an output, wherein the first input of the AND gate is coupled to the comparison signal, the second input of the AND gate is coupled to the output of the over-voltage comparator, and the output of the AND gate is coupled to the input of the driver.

9. The off-line regulator of claim 1, wherein the rectification circuit comprises a full bridge rectifier.

10. An off-line regulator, comprising:
a rectification circuit configured to rectify an AC line voltage into a rectified line voltage;
a BJT having a first end, a second end and a base end, wherein the first end is coupled to the rectified line voltage;
a selecting and driving circuit configured to selectively drive the BJT at least according to the rectified line voltage, the selecting and driving circuit having an input and an output, wherein the input is coupled to the rectified line voltage, and wherein the output is coupled to the base end of the BJT, and further wherein the BJT is turned ON when the rectified line voltage is lower than a threshold voltage; and
a converter configured to deliver power to a load, the converter having an input and an output, wherein the input of the converter is coupled to the second end of the BJT, and wherein the output of the converter is configured to provide a DC output voltage;
wherein the selecting and driving circuit further comprises:
a comparator, having a first input, a second input and an output, wherein the first input of the comparator is coupled to the rectified line voltage, and the second input of the comparator is coupled to a the threshold voltage;
a driver, having an input, an output, a first power end and a second power end, wherein the input of the driver is coupled to the output of the comparator, and the output of the driver is coupled to the base end of the BJT; and
a second capacitor, having a first end and a second end, wherein the first end of the second capacitor is coupled to the first power end, and wherein the second end of the driver is coupled to the second power end;
wherein the second capacitor is configured to be charged by the first capacitor when the BJT is in OFF state.

11. The off-line regulator of claim 10, wherein the BJT is an NPN transistor, wherein the first end is a collector, and wherein the second end is an emitter.

12. The off-line regulator of claim 10, further comprising a first capacitor coupled between the second end of the BJT and a reference ground.

13. The off-line regulator of claim 10, wherein the selecting and driving circuit further comprises:
a first switch coupled between the second power end and the second end of the BJT;
a second switch coupled between the second power end of the driver and a reference ground; wherein
when the BJT is turned on, the first capacitor is charged, the first switch is turned on and the second switch is turned off; and when the BJT is turned off, the first switch is turned off, the second switch is turned on, and the first capacitor charges the second capacitor.

14. The off-line regulator of claim 13, wherein:
the selecting and driving circuit further comprises a NOR gate, the NOR gate having an input and an output, wherein the input of the NOR gate is coupled to the output of the comparator, and wherein the output of the NOR gate is coupled to a control end of the second switch; and
the output of the comparator is further coupled to a control end of the first switch.

15. A circuit comprising:
an input power terminal, configured to receive a rectified line voltage, the input power terminal is further coupled to a first end of a pass device;
an output driving terminal, coupled to a control end of the pass device;
an interim voltage terminal, coupled to a second end of the pass device and a first capacitor, the interim voltage terminal is configured to provide an interim voltage;
a first bootstrap terminal, coupled to a first end of a second capacitor;
a second bootstrap terminal, coupled to a second end of the second capacitor;
a comparator, having a first input, a second input and an output, wherein the first input is coupled to the input power terminal, wherein the second input is coupled to a threshold voltage, and wherein the output is configured to provide a comparison signal; and
a driver, having an input, an output, a first power end and a second power end, wherein the input of the driver is coupled to the comparison signal, the output of the driver is coupled to the output driving terminal, the first power end is coupled to the first bootstrap terminal and the second power end is coupled to the second bootstrap terminal;
wherein the second capacitor is configured to be discharged when the comparison signal is at a first state, and wherein the second capacitor is configured to be charged by the first capacitor when the comparison signal is at a second state.

16. The circuit of claim 15, further comprising an output terminal and a transistor, wherein the transistor comprises a first end coupled to the interim voltage terminal and comprises a second end coupled to the output terminal, wherein the output terminal is further coupled to an output capacitor, and further wherein the output terminal is configured to provide an DC output voltage.

17. The circuit of claim 15, further comprises:
a first switch coupled between the second bootstrap terminal and the output driving terminal, wherein the first switch is configured to be turned ON or OFF according to the comparison signal; and
a second switch coupled between the second bootstrap terminal and a reference ground, wherein the second switch is configured to be turned ON or OFF according to the comparison signal.

18. A method of converting an AC voltage into a DC voltage, the method comprising:
rectifying an AC line voltage into a rectified line voltage;
coupling a pass device to the rectified line voltage, turning ON the pass device when the rectified line voltage is lower than a threshold, and charging a first capacitor by the pass device;
providing an input voltage to a converter by the first capacitor; and
delivering power to a load by the converter;
further comprising coupling a second capacitor between a first power end of the driver and a second power end of the driver, wherein the second capacitor is charged by the first capacitor when the rectified line voltage is higher than the threshold, and wherein the second capacitor is boosted and discharged when the rectified line voltage is lower than a threshold.

* * * * *